July 13, 1954 — E. W. ANDERSON — 2,683,283
DISPENSING APPARATUS FOR MOLDABLE MATERIAL
Filed Aug. 3, 1950 — 2 Sheets-Sheet 1

Eric W. Anderson, Inventor,
Haynes and Koenig,
Attorneys.

July 13, 1954     E. W. ANDERSON     2,683,283
DISPENSING APPARATUS FOR MOLDABLE MATERIAL
Filed Aug. 3, 1950     2 Sheets-Sheet 2
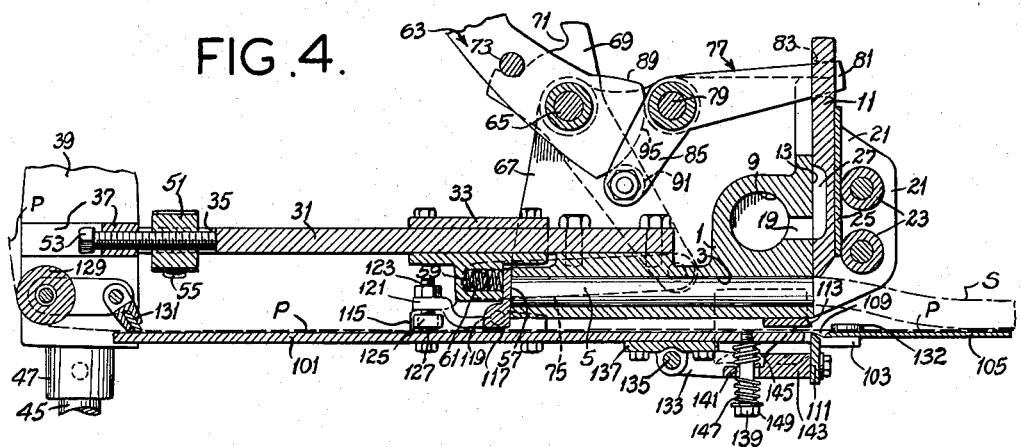
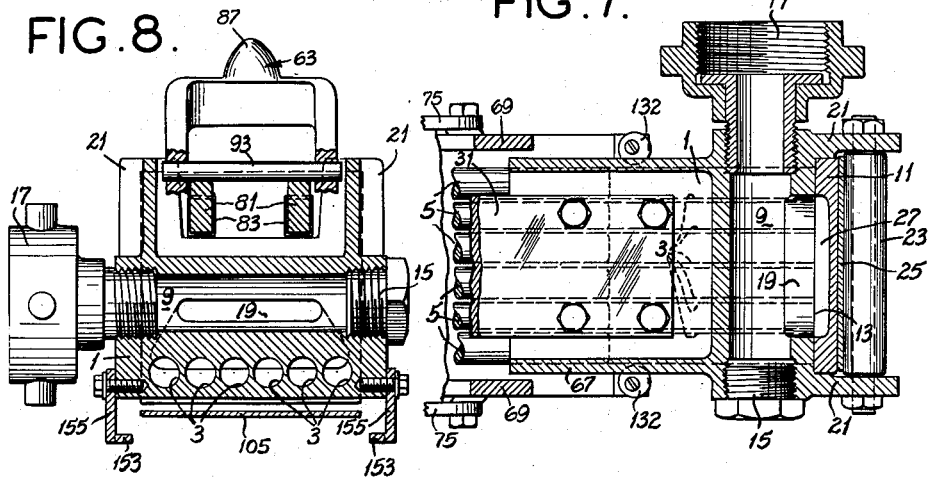
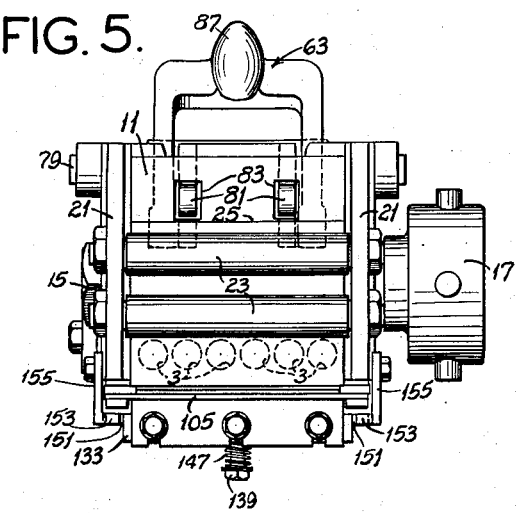
Eric W. Anderson,
Inventor,
Haynes and Koenig,
Attorneys.

Patented July 13, 1954

2,683,283

UNITED STATES PATENT OFFICE 2,683,283

DISPENSING APPARATUS FOR MOLDABLE MATERIAL

Eric W. Anderson, Chicago, Ill., assignor to Dohm and Nelke Incorporated, St. Louis, Mo., a corporation of Missouri Application August 3, 1950, Serial No. 177,419

13 Claims. (Cl. 17—32)

This invention relates to dispensing apparatus for moldable material, and more particularly to apparatus of this class for molding and dispensing sausage meat in link sausage form.

The principal object of the invention is the provision of an apparatus particularly for readily dispensing sausage meat in the form of link sausages ready for packaging without sausage casings, thereby eliminating casing costs, though not limited to dispensing sausage meat and adapted generally for the dispensing of other moldable materials. In general, an apparatus embodying the invention comprises, among its primary features, a stationary mold having a cavity open at one end. A plunger is reciprocable in the cavity toward and away from its open end. A head is provided for closing the open end of the cavity during the molding of a moldable material such as sausage meat therein. Means is provided whereby moldable material may be introduced under pressure into the cavity through its open end to mold the material therein, with the head closed. With the head open, the plunger may be moved toward the open end of the cavity to eject the molded material therefrom. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a plan view of a sausage dispensing apparatus of this invention, a roll-holding shaft being omitted, and a handle being broken away;

Fig. 4 is a vertical longitudinal section taken on line 4—4 of Fig. 1, with parts including the handle being broken away, and showing parts in a moved position with respect to Fig. 1;

Fig. 5 is an end elevation as viewed from the right of Fig. 2;

Fig. 7 is a horizontal section taken on line 7—7 of Fig. 2; and

Fig. 8 is a vertical transverse section taken on line 8—8 of Fig. 2.

Similar reference characters indicate corresponding parts throughout the several views of the drawings.

Figure 1:
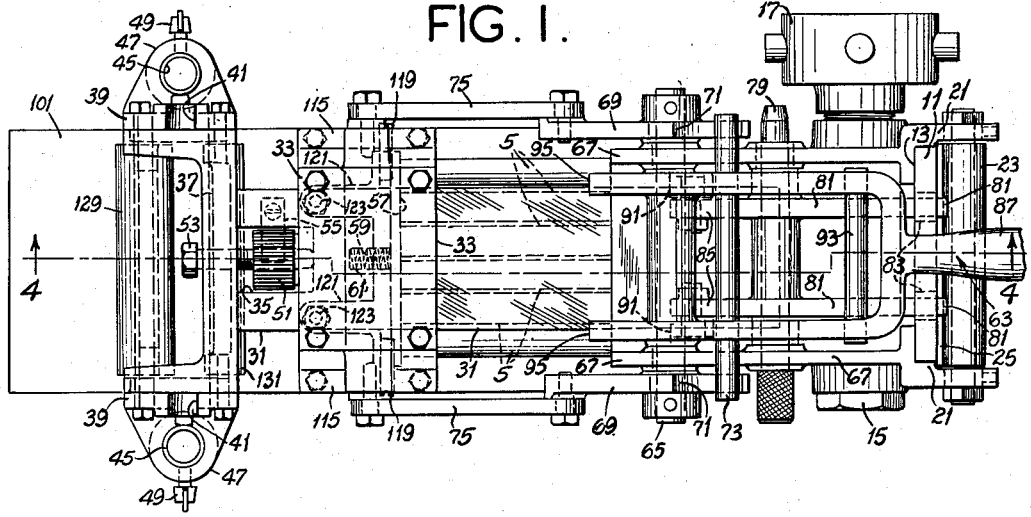
Figure 2:
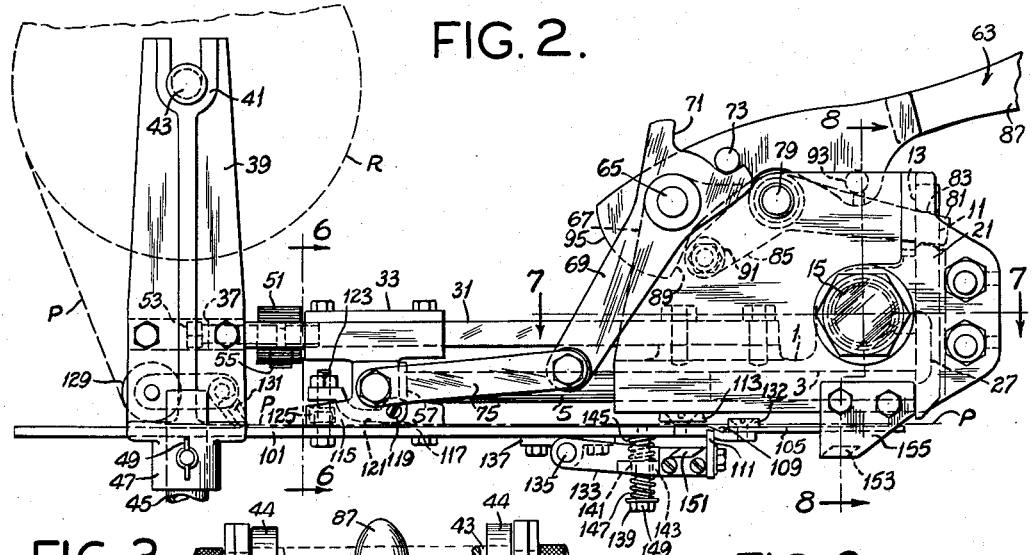
Fig. 2 is a side elevation of Fig. 1 showing the roll-holding shaft.
Figure 3:
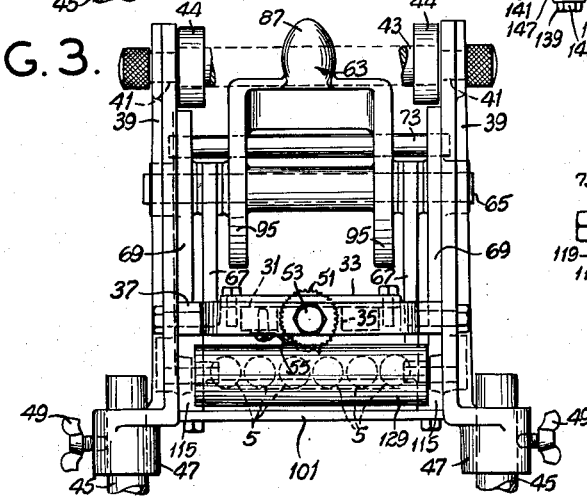
Fig. 3 is an end elevation, as viewed from the left of Fig. 2, the roll-holding shaft being broken away.
Figure 6:
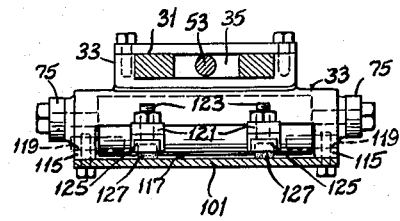
Fig. 6 is a vertical transverse section taken on line 6—6 of Fig. 2, certain handle and head structure being omitted.

Referring to the drawings, a specific embodiment of the dispensing apparatus of this invention particularly for molding and dispensing sausages is shown to comprise a stationary mold 1 having six cavities 3, each of link sausage form, for molding sausage meat into link sausages without sausage casings. Each cavity, as shown, is of elongate cylindrical form, having the diameter desired for the sausages to be dispensed, and a length somewhat longer than the longest sausage which is to be dispensed. The cavities are arranged horizontally side-by-side and parallel to one another in the mold, and extend completely through the mold from its rearward end (its left end as illustrated in Figs. 1, 2 and 4) to its forward end. Reciprocable in each cavity is a discharge plunger 5, for discharging a sausage molded in a cavity through its forward discharge end at the forward end of the mold. The cavities are adapted to be filled with sausage meat under pressure from a manifold supply chamber 9 formed in the mold adjacent its forward end, flow of sausage meat from the chamber to the cavities being controlled by mold-filling means comprising a head 11 which is vertically slidable on the flat vertical forward face 13 of the mold.

The chamber 9 is conveniently formed as a transverse cylindrical bore extending through the mold from one side to the other above the forward ends of the cavities 3. A closure plug 15 is threaded in one end of the chamber and a union 17 is provided at its other end for coupling the mold to an outlet of a conventional air pressure operated sausage stuffing machine (not shown). The latter is of a type which is adapted to discharge sausage meat at high pressure through one or more outlets, not being particularly described herein as such machines are known in the art. With the mold 1 coupled to an outlet of such a machine, the chamber 9 is maintained filled with sausage meat under high pressure. An elongate horizontal slot 19 opens from the chamber 9 through the forward face 13 of the mold, providing a discharge port from the chamber.

The head 11 consists of a plate guided for vertical sliding movement on the forward face of the mold by side guides 21 formed integrally with the mold, and held in the guides in sealing relation against the forward face of the mold by rollers 23 located between the side guides. A wear plate is shown at 25. In the face of the head 11 toward the mold is a valve cavity 27, making the head a D-valve, the vertical dimension of the valve cavity corresponding to the vertical spacing of the slot or port 19 and the mold cavities 3. As shown, the length of the slot 19 is somewhat less than the widthwise distance between the two outermost mold cavities 3, and the cavity 27 widens in downward direction from the width of the slot to the widthwise spacing of the two outermost mold cavities (see Fig. 8). The head or valve member 11 is movable between the raised retracted position shown in Fig. 4, wherein the discharge ends of the mold cavities 3 are unblocked, and wherein slot 19 is blocked, and the lowered mold-filling position shown in Fig. 2 wherein it closes the discharge ends of the mold cavities and establishes communication from chamber 9 through slot 19 and valve cavity 27 to the discharge ends of all six mold cavities 3.

Fixed to the mold and extending rearward therefrom is a horizontal carriage slide plate 31 which guides a carriage 33 for reciprocation toward and away from the mold in axial direction as regards the cavities 3 and plungers 5. The plate 31 has an opening or notch 35 in its rearward end. Extending across the rearward end of the plate is a horizontal cross-frame member 37 which is fixed in position between two vertical pedestals 39 for holding a roll R of suitable packaging paper, such as parchment paper. The pedestals have bearings 41 at their upper ends for journalling a roll-holding shaft 43 with its axis above and transverse to the axes of cavities 3. On the shaft 43 are spacers 44 for centering the roll R. The pedestals are carried by legs 45, shown broken away, which are vertically adjustable in sleeves 47 at the lower ends of the pedestals. Set screws 49 are provided to hold the legs in adjusted position. Legs 45 are adjusted so that with the union 17 connected to an outlet of a sausage stuffing machine, the dispensing apparatus may be adequately supported on a table (not shown) with cavities 3 horizontal and spaced some distance above the table.

The carriage 33 is horizontally slidable between the retracted position illustrated in Fig. 2 and the advanced position illustrated in Fig. 4. Its retracted position is determined by its engagement with an adjustable stop 51, comprising a nut adjustably threaded on a bolt 53 threaded through member 37 and extending into the notch 35 in plate 31, the nut being located in the notch. The periphery of the nut is toothed for cooperation with a spring-arm detent 55 mounted on the plate 31 to hold the nut in adjusted position. The advanced position of the carriage is determined by engagement with the rearward end of the mold of a plunger-engaging abutment 57 pivoted on the carriage on a transverse axis. The abutment is biased to rock in clockwise direction as viewed in Fig. 4 by a compression spring 59 housed in a spring pocket 61 in the carriage. Plungers 5 are generally of the same length as the cavities 3. The arrangement is such that when the carriage 33 is fully retracted, the plungers may move back to a fully retracted position determined by engagement of their rearward ends with abutment 57 on the retracted carriage (Fig. 2), wherein their forward ends are spaced from the forward ends of cavities 3 the length of the sausages which it is desired to dispense. This length may be varied by adjusting the carriage stop nut 51. When the carriage is moved forward, the plungers are driven forward through the cavities 3 to the fully advanced position shown in Fig. 4 wherein their forward ends are at the forward face 13 of the mold 1.

At 63 is shown a hand lever for manually operating both the slide valve member 11 and the carriage 33. The lever is pivoted for swinging movement on a transverse shaft 65 mounted above the rearward ends of the cavities 3 in bearings in upwardly extending side members 67 formed integrally with the mold. The lever is rotary on the shaft. Fixed on the ends of the shaft are levers 69 which are forked at their upper ends as indicated at 71. The hand lever 63 carries a pin 73 the ends of which extend into the forks at the upper ends of levers 69 to provide a lost-motion connection between the hand lever 63 and levers 69. Links 75 connect the lower ends of levers 69 and the carriage 33. The arrangement is such that the hand lever 63 may be swung upward from the lowermost limit of its swing illustrated in Fig. 2 to the uppermost limit of its swing illustrated in Fig. 4 to drive the carriage 33 from its retracted position toward the mold to its advanced position, movement of the carriage taking place after an initial lost-motion interval during which the pin 73 traverses the forks at the upper ends of levers 69 counterclockwise as viewed in Fig. 2. Similarly, the lever may be swung downward from the uppermost limit of its swing (Fig. 4) to the lowermost limit of its swing (Fig. 2) to drive the carriage 33 back from its advanced position to its retracted position, after an initial lost-motion interval during which the pin traverses the forks at the upper ends of levers 69 clockwise as viewed in Fig. 4.

The slide valve member 11 is actuated by a pair of bell crank levers 77 pivoted for rocking movement on a transverse shaft 79 mounted in the upwardly extending side members 67. The bell crank levers have arms 81 extending forward from shaft 79 through openings 83 in the valve member 11, and arms 85 angled downward and rearward from shaft 79. Hand lever 63, which is of U-shape with a handle 87, has the lower ends of its sides formed as cams 89 for engaging cam follower rollers 91 at the free ends of bell crank arms 85. The hand lever also carries a pin 93 for engaging bell crank arms 81 from above to rock the bell cranks clockwise as viewed in Fig. 2. The arrangement is such that when the hand lever is swung upward from its Fig. 2 position, the cams 89 at the lower ends of the hand lever, engaging cam follower rollers 91, rock the bell cranks counterclockwise as viewed in Fig. 2 thereby to lift the slide valve member 11 to its raised Fig. 4 position. This occurs during the initial lost-motion interval, before carriage 33 is moved forward. When the hand lever is swung downward from its Fig. 4 position, near the end of its movement pin 93 engages bell crank arms 81 and rocks the bell cranks clockwise, thereby driving the slide valve member downward to its lowered Fig. 2 position. The cam ends 89 of the sides of the hand lever are so formed as to hold down the cam follower rollers 91 after the bell cranks have fully raised the valve member without further moving the bell cranks so as to hold the valve member in raised position. It will be noted in this connection that the cam ends 89 have an arcuate edge 95 on an arc centered in the axis of shaft 85 for this purpose.

From the above, it will be seen that when the hand lever 63 is in its lowered position (Fig. 2), the carriage 33 is retracted and the member 11 is in its lowered position wherein it accomplishes two purposes: it functions as a head for closing the discharge ends of the mold cavities 3 and as a valve establishing communication from the supply chamber 9 to the discharge ends of the cavities. Sausage meat, under pressure, flows into the mold cavities through their discharge ends from the chamber 9 through slot or port 19 and the valve cavity 27, and fills the mold cavities 3 forcing the plungers 5 back until their rearward ends engage the abutment 57 on the retracted carriage, the plungers rocking the abutment 57 back against the bias of spring 59. The cavities 3 are filled with meat all the way back to the forward ends of the plungers 5, thereby forming six individual sausages. Then, by swinging the hand lever 63 upward, the valve member 11 is raised to unblock the discharge ends of the cavities 3, cut off flow of sausage meat, and cleanly shear off the meat at the forward face of the mold 1. This occurs before carriage 33 is driven forward. After the valve member has been fully raised, carriage 33 is driven forward to drive the plungers 5 forward, thereby to eject the molded sausages from the cavities 3. The hand lever 63 may then be swung downward to again mold six sausages, and so on.

The apparatus includes means for feeding the end of a strip of paper or other suitable sheet material P from the roll R under the sausages being ejected by plungers 5 from the cavities 3 into position to receive the sausages, and for cutting off the end of the paper strip upon each sausage-ejecting operation. As shown, this means comprises a platen 101 carried by the carriage 33 for reciprocation in a horizontal plane spaced somewhat below the bottom of the mold 1. The platen is slightly narrower than the transverse spacing of the pedestals 39 and of such length and fixed to the carriage in such position that when the carriage is in its advanced position (Fig. 4) the forward end of the platen is closely adjacent the forward ends of cavities 3 and the rearward end of the platen is between the pedestals 39. At its forward end, the platen has side extensions 103. These carry an apron 105 extending forward from the platen, with a space 109 between the forward end of the platen and the rearward end of the apron accommodating a knife 111 mounted to move upward from a retracted position below the platen through the space 109 to cut off the paper in conjunction with a horizontal blade 113 fixed to and spaced above the platen.

The platen 101 is fixed to the bottom edges of depending side flanges 115 of the carriage 33 so as to provide a paper passage 117 between the carriage and the platen. The flanges 115 also serve as side guides for the paper. The rocking abutment 57 is pivotally mounted by means of pivot pins 119 fixed in these side flanges 115. The abutment is formed with rearwardly extending clamp arms 121. At the rearward free ends of these arms are bolts 123, having heads 125 below the arms provided with resilient paper-gripping pads 127. The paper P leads off the roll R around a guide roll 129 mounted at its ends in the pedestals 39, thence under a pawl-type paper stop 131 pivoted at its ends in the pedestals, thence over the platen 101 under the arms 121 and through the paper passage 117 under the mold 1, under the blade 113 and on to the apron 105. The latter is provided with side guides 132 for the paper.

With the carriage 33 in its retracted position (Fig. 2), the platen 101 is retracted. With the plungers 5 holding the abutment 57 rocked back against the bias of spring 61, the arms 121 are rocked down so that the paper is clamped against the platen by the pads 127 on the heads of bolts 125. Thus, whenever the carriage is moved forward to its advanced position (Fig. 4), a length of paper is pulled from the roll R. When the carriage is subsequently returned to its retracted position, the abutment 57 rocks clockwise, as viewed in Figs. 2 and 4, to lift the paper clamp arms 121 and release the paper. The paper is prevented from moving back with the platen by the paper stop 131.

The knife 111 is mounted so as to be movable upward from a retracted position wherein its cutting edge is below the upper surface of the platen 101 into shearwise engagement with the fixed blade 113 to cut off the length of paper which extends over the apron 105. As shown, the knife is mounted at the forward end of a knife holder 133 pivoted at 135 in brackets 137 fixed to the bottom of the platen. The knife holder extends forward from its pivotal axis, which extends transversely under the plate. A stud 139 extends down from the platen through an opening 141 in a cross bar 143 of the knife holder. A coil spring 145 surrounds the stud between the platen and cross bar and another coil spring 147 surrounds the stud between the cross bar and a head 149 at the lower end of the stud. Springs 145 and 147 normally maintain the holder 133 and knife in retracted position. Extending outward from the sides of the knife holder at its forward end are cam follower members 151. These ride up on cams 153 at the lower ends of members 155 fixed to the sides of the mold 1 adjacent its forward end near the end of the forward movement of the platen to rock the knife holder and the knife upward through a cutting stroke. Upon the return movement of the platen, the cam followers 151 ride under the fixed cams 153. Spring 147 permits this.

Operation is as follows:

When the hand lever 63 is in its raised position (Fig. 4), the valve member 11 is raised, the carriage 33 and platen 101 are forward, with the apron 105 forward of the mold below the level of the cavities 3, and the plungers 5 are forward with their forward ends at the forward end of the mold. As a result of a previous operation of the apparatus, the paper P will have been cut off at the fixed blade 113, and the forward end of the paper will lie under the edge of the blade.

As the hand lever 63 is moved down from its Fig. 4 position, no action occurs until the pin 73 has traversed the width of the forks 71 at the upper ends of levers 69. Then the pin 73 engages the levers 69 and rocks them clockwise as viewed in Fig. 5. This pushes links 75 to the left and thereby moves carriage 33 to the left away from the rearward end of the mold. Near the end of the downward movement of the hand lever, the pin 93 on the hand lever engages the arms 81 of the bell crank levers 77 and rocks them clockwise as viewed in Figs. 2 and 4. Bell crank arms 81 drive the slide valve member 11 down to its lowered cavity-closing and cavity-filling position (Fig. 2). The hand lever is moved down until carriage 33 reaches its retracted position engaging the carriage stop 51 (Fig. 2). This limits downward movement of the hand lever and determines its lowered position.

The platen 101 is retracted from its forward Fig. 4 position to its rearward retracted Fig. 2 position along with the carriage 33. During retraction, the spring 61 holds the paper clamp arms 121 raised so that the paper is not clamped to the platen as the platen is retracted, and the paper stop 131 prevents the paper from moving back. The result is that the reach of paper extending over the platen remains stationary while the platen moves back, so that, when the platen reaches its retracted position, an end portion of the paper corresponding in length to the stroke of the platen extends from the edge of the fixed blade 113 forward over the apron 105 (see Fig. 2).

With the slide valve member 11 in its lowered cavity-closing and cavity-filling Fig. 2 position, sausage meat flows from chamber 9 through port 19 and valve cavity 27 into the mold cavities 3 through their discharge ends, forcing the plungers 5 rearward until their rearward ends engage abutment 57, and filling the mold cavities. The plungers rock the abutment 57 back against the bias of spring 61, thereby moving paper clamp arms 121 downward to clamp the paper against the platen 101.

Then, when the hand lever 63 is moved upward, the carriage 33 remains in its retracted position during the lost-motion interval in which the pin 73 on the hand lever is traversing the width of the forks 71 at the upper ends of levers 69. During this interval, the cam ends 89 of the hand lever rock the bell cranks 77 counterclockwise as viewed in Figs. 2 and 4 so that bell crank arms 81 raise the slide valve member 11 to its raised position unblocking the discharge ends of the mold cavities 3 and blocking the port 19. The valve member 11, in being raised, cleanly shears off the meat at the forward face 13 of the mold 1.

When the pin 73 engages the levers 69 after the lost-motion interval, it rocks levers 69 counter-clockwise as viewed in Fig. 2. This pulls links 75 to the right and thereby moves carriage 33 forward to the right toward the rearward end of the mold. As the carriage moves forward, it drives the plungers 5 through the mold cavities 3 to eject the sausages therefrom. The platen 101 moves forward with the carriage. Since the paper is clamped against the platen by the paper clamp constituted by arms 121 and bolts 123, the paper moves forward with the platen. The apron 105, covered by the forward end portion of the paper, moves into position under the sausages being ejected, one of these being shown in dot-dash lines at S in Fig. 4. As the platen reaches its forward position, the cam followers 151 on the knife holder 133 come into engagement with the fixed cams 153. This action rocks the knife 111 upward to shear the paper against the blade 113, thereby cutting off the end portion of the paper on the apron. The hand lever 63 is moved upward until the carriage 33 reaches its advanced position (Fig. 4), determined by engagement of the abutment 57 with the rear end of the mold. This limits upward movement of the hand lever and determines its raised position.

Then, by moving the hand lever down, the slide valve member 11 is returned to its lowered cavity-closing and cavity-filling position (Fig. 2). As the member 11 moves downward, its lower edge shears off the ends of the sausages from the ends of the plungers. This is of importance as the ends of the sausages have a tendency to adhere to the ends of the plungers. As the hand lever is moved down, the platen 101 and apron 105 are retracted. This causes the six sausages on the piece of paper on the apron to be raked off, the sausages on the paper either being caught in the hand or allowed to drop into a packaging container, or on to a moving conveyor belt, under the advanced position of the apron. With the member 11 in its lowered position, six more sausages are formed. When it is desired to dispense these, the hand lever is moved up, and then down, repeating the above-described operations. The normal at rest position of the hand lever is its down position, and one dispensing operation involves raising and lowering the hand lever.

While the invention is above described specifically as applied to molding sausage meat into sausages and dispensing the molded sausages, it will be understood that it is applicable to the molding of moldable material in general. For example, it is applicable to dispensing moldable foods, such as cheese, or any putty-like moldable material.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Sausage dispensing apparatus comprising a stationary mold having a generally horizontal cavity therein of sausage form and of substantially uniform cross-section throughout its length and open at one end, a plunger reciprocable in the cavity toward and away from its open end, a head associated with the mold mounted for movement between a position extending across the open end of the cavity and an open position, means associated with the mold having a passage for feeding sausage meat under pressure into the cavity with the head in its first-mentioned position to mold a sausage therein, and means associated with the mold for manually operating the plunger and the head including a hand lever having operative connections with the plunger and head movable in one direction for moving the head to its first-mentioned position and in the opposite direction for first opening the head and then moving the plunger toward the open end of the cavity to eject a molded sausage therefrom, and means under the mold operable by the hand lever for feeding the end portion of a strip of paper into position to receive the ejected sausage and to cut off the end portion of the paper.

2. Sausage dispensing apparatus comprising a stationary mold having a plurality of generally horizontal elongate cavities therein of substantially uniform cross-section throughout their length and open at one end, plungers reciprocable in the cavities toward and away from their open ends, a head associated with the mold mounted for movement between a position extending across the open ends of all the cavities and an open position, means associated with the mold having a passage for feeding sausage meat under pressure simultaneously into all the cavities with the head in its first-mentioned position to mold a sausage in each cavity, means associated with the mold for manually operating the plungers and the head including a hand lever having operative connections with the plungers and head movable in one direction for moving the head to its first-mentioned position and in the opposite direction for first opening the head and then moving all the plungers in unison toward the open ends of the cavities to eject molded sausages therefrom, and means under the mold operable by the hand lever for feeding the end portion of a strip of paper into position to receive the ejected sausages and to cut off the end portion of the paper.

3. Sausage dispensing apparatus comprising a mold having a plurality of elongate cavities therein extending parallel to one another and side-by-side and open at one end of the mold, mold-filling means associated with the mold at said one end having a passage for introducing sausage meat under pressure into the cavities through their open ends to mold sausages therein, said means being mounted for movement into position for filling the cavities and away from said filling position to a retracted position unblocking the open ends of the cavities. plungers reciprocable in the cavities, means associated with the mold engageable by the plungers determining a retracted position of the plungers wherein their ends toward the open ends of the cavities are spaced rearward of the open ends of the cavities a distance corresponding to the length of sausages to be formed, means acting on the plungers for moving them forward from their retracted position to eject molded sausages therefrom after the mold-filling means has been moved to its retracted position, means associated with said plunger-moving means and movable forward with the plungers for feeding the end portion of a strip of paper into position to receive the ejected sausages, a knife associated with said strip feeding means for cutting off the end portion of the paper, and means controlled by the strip feeding means acting to operate the knife to cut off the end portion of the paper as the plungers reach the open ends of the cavities.

4. Sausage dispensing apparatus comprising a mold having a plurality of elongate cavities therein extending parallel to one another and side-by-side and open at one end of the mold, mold-filling means having a passage for introducing sausage meat under pressure into the cavities through their open ends to mold sausages therein, said means being mounted for movement into position at the open ends of the cavities for filling the cavities and away from said filling position to a retracted position unblocking the open ends of the cavities, plungers reciprocable in the cavities, means associated with the mold determining a retracted position of the plungers wherein their ends toward the open ends of the cavities are spaced rearward of the open ends of the cavities a distance corresponding to the length of sausages to be formed, means acting on the plungers for moving them forward from their retracted position to eject molded sausages from the cavities, a hand lever associated with the mold, mechanism linking the hand lever and the mold-filling means and plunger-moving means for moving the mold-filling means into mold-filling position upon movement of the hand lever in one direction, and for first moving the mold-filling means to retracted position and then driving the plunger-moving means forward upon movement of the hand lever in the opposite direction, means carried by the plunger-moving means for feeding the end portion of a strip of paper forward into position to receive the ejected sausages, a knife carried by said strip feeding means for cutting off the end portion of the paper, and cam means including cooperating elements on the strip feeding means and mold for operating the knife to cut off the end portion of the paper as the plungers reach the open ends of the cavities.

5. Sausage dispensing apparatus comprising a mold having a plurality of elongate cavities parallel to one another and side-by-side extending completely through the mold from its rearward to its forward end, a slide valve member at the forward end of the mold slidable between a mold-filling position extending across the forward ends of the cavities and a retracted position unblocking the forward ends of the cavities, said mold having a chamber for a supply of sausage meat under pressure and a discharge port from the chamber at the forward end of the mold, the slide valve member being adapted to establish communication from the chamber through the port to the forward ends of all the cavities when the valve member is in its mold-filling position extending across the forward ends of the cavities, plungers reciprocable in the cavities, a carriage reciprocable from a retracted position toward the rear end of the mold for driving the plungers toward the forward ends of the cavities, manual means associated with the mold for operating the valve member and carriage, said means including a hand lever having operative connections with the valve member and carriage movable in one direction to move the valve member to its mold-filling position and retract the carriage, and in the opposite direction to move the valve member to retracted position and then drive the carriage from its retracted position toward the rear end of the mold, a paper clamp carried by the carriage for clamping a strip of paper to feed the end portion of the strip of paper into position to receive sausages ejected from the cavities by the plungers, means associated with the carriage controlling the clamp to cause it to clamp the paper only on the forward movement of the carriage, a knife carried by the carriage for cutting off the end portion of the paper, and cam means including cooperating elements on the knife and the mold for operating the knife to cause it to cut off the end portion of the paper as the carriage reaches the rear end of the mold.

6. A sausage machine comprising a stationary mold having a plurality of elongate cavities extending therethrough from a rearward to a forward end of the mold, said cavities being parallel to one another and side-by-side in a generally horizontal plane, plungers reciprocable in the cavities, a carriage movable toward and away from the rearward end of the mold and adapted upon movement toward the rearward end of the mold to drive the plungers toward the forward ends of the cavities, means associated with the mold for determining a rearward retracted position of the carriage, means associated with the mold for blocking the forward ends of the cavities to hold the sausage meat under pressure therein and for introducing sausage meat under pressure into the cavities to mold sausages therein mounted for movement between a mold-filling position extending across the forward ends of the cavities and a retracted position unblocking the forward ends of the cavities, means associated with the carriage under the mold for gripping a strip of paper to feed an end portion of the strip into a position forward of the forward end of the mold and below the level of the cavities, and means associated with the carriage for cutting off the end portion of the strip fed to such position.

7. A sausage machine as set forth in claim 6 wherein the means for closing the forward ends of the cavities and introducing sausage meat into the cavities comprises a slide valve member slidable on the forward end of the mold between a mold-filling position closing the forward ends of the cavities and a retracted position unblocking the forward ends of the cavities, the mold having a chamber for a supply of sausage meat under pressure and a discharge port from the chamber at the forward end of the mold, the slide valve member having a passage for establishing communication from the chamber through the discharge port to the forward ends of all the cavities when the valve member is in its mold-filling position.

8. A sausage machine as set forth in claim 6 wherein the means for gripping the strip comprises a paper clamp carried by the carriage for clamping the strip to the carriage for movement therewith, and wherein the clamp is controlled by means associated with the carriage which acts to cause it to clamp the strip only on the forward movement of the carriage, releasing its grip upon rearward movement of the carriage.

9. A sausage machine as set forth in claim 6 wherein the means for cutting the strip comprises a knife mounted for pivotal movement on the carriage and cooperating cam elements on the knife and mold acting to effect strip-severing movement of the knife as the carriage, in moving forward, reaches the rear end of the mold.

10. Sausage dispensing apparatus comprising a stationary mold having a generally horizontal cavity therein of sausage form open at one end, a plunger reciprocable in the cavity toward and away from its open end, a head associated with the mold mounted for movement between a position blocking the open end of the cavity for holding sausage meat under pressure therein and an open position, means associated with the mold having a passage for feeding sausage meat under pressure into the cavity with the head in blocking position to mold a sausage therein, and means associated with the mold for operating the plunger and the head having operative connections with the plunger and head for moving the head to blocking position to mold a sausage and then opening the head and moving the plunger toward the open end of the cavity to eject the molded sausage therefrom, and means under the mold actuated by said operating means for feeding the end portion of a strip of sheet material into position to receive the ejected sausage and cutting off the end portion of the sheet material.

11. Sausage dispensing apparatus comprising a stationary mold having a plurality of generally horizontal elongate cavities therein open at one end, plungers reciprocable in the cavities toward and away from their open ends, a head associated with the mold mounted for movement between a position blocking the open ends of all the cavities and an open position, means associated with the mold having a passage for feeding sausage meat under pressure simultaneously into all the cavities with the head in blocking position to mold a sausage in each cavity, means associated with the mold for operating the plungers and the head including operative connections with the plungers and head for moving the head to blocking position to mold a sausage in each cavity and then opening the head and moving all the plungers in unison toward the open ends of the cavities to eject molded sausages therefrom, and means under the mold actuated by said operating means for feeding the end portion of a strip of paper into position to receive the ejected sausages and cutting off the end portion of the paper.

12. Apparatus for forming moldable material into molded bodies and dispensing the molded bodies, comprising a stationary mold having a forward end face and a mold cavity which extends into the mold from said forward end face, said cavity being completely peripherally closed and being open at its end at said forward end face of the mold, a plunger freely slidable in the cavity toward and away from the said open end of the cavity, means associated with the mold for limiting movement of the plunger away from the open end of the cavity, said mold also having a chamber for a supply of moldable material under pressure with a discharge port from the chamber to the forward end face of the mold, a D-valve slidable on the forward end face of the mold between a retracted position blocking said port and unblocking the cavity and a mold-filling position wherein it establishes communication from the chamber through the port to the cavity via the open end of the cavity, the plunger being free for movement away from the open end of the cavity by moldable material flowing from the chamber to the cavity through the open end of the cavity until its movement is arrested by said limiting means, and means associated with the mold operable on the D-valve and plunger for moving the D-valve to its retracted position and then driving the plunger toward the open end of the cavity.

13. Apparatus for forming moldable material into molded bodies and dispensing the molded bodies, comprising a stationary mold having a cylindrical bore extending completely therethrough from a rearward end to a forward end of the mold, said bore being completely peripherally closed, a plunger freely slideable in the bore between a forward position wherein its forward end is at the forward end of the bore and a rearward position wherein it extends rearward out of the rearward end of the bore, a carriage reciprocable toward and away from the rearward end of the mold engageable with the rearward end of the plunger and having a retracted position rearward of the mold wherein it is engaged by the rearward end of the plunger to determine the rearward position of the plunger, said carriage being movable toward the rearward end of the mold to drive the plunger forward in the bore, said mold also having a chamber for a supply of moldable material under pressure with a discharge port from the chamber to the forward end of the mold, a D-valve slidable on the forward end of the mold between a retracted position blocking said port and unblocking the forward end of the bore and a mold-filling position wherein it establishes communication from the chamber through the port to the bore via the forward end of the bore, means associated with the mold and operable on the D-valve and carriage for moving the D-valve to mold-filling position and retracting the carriage, the plunger thereupon being free for rearward movement by the moldable material flowing from the chamber to the bore through the forward end of the bore until stopped by the carriage, said means also being operable for moving the D-valve to retracted position and then driving the carriage forward to drive the plunger forward to its forward position.

References Cited in the file of this patent

UNITED STATES PATENTS

| Number | Name | Date |
|---|---|---|
| 2,397,446 | Tansley | Mar. 26, 1946 |
| 2,413,046 | Holly | Dec. 24, 1946 |
| 2,442,633 | Archer et al. | June 1, 1948 |
| 2,500,973 | Ackerman | Mar. 21, 1950 |
| 2,585,204 | Wondra | Feb. 12, 1952 |

FOREIGN PATENTS

| Number | Country | Date |
|---|---|---|
| 259,140 | Germany | Apr. 23, 1913 |
| 293,638 | Germany | Aug. 21, 1916 |